(12) United States Patent
Hawker et al.

(10) Patent No.: US 8,567,309 B2
(45) Date of Patent: Oct. 29, 2013

(54) HAND TOOL FOR STUFFING PITTED OR CORED PRODUCE

(76) Inventors: Christopher L. Hawker, Columbus, OH (US); Phillip Campbell, Livingston, MT (US)

( * ) Notice: Subject to any disclaimer, the term of this patent is extended or adjusted under 35 U.S.C. 154(b) by 432 days.

(21) Appl. No.: 12/831,788

(22) Filed: Jul. 7, 2010

(65) Prior Publication Data

US 2011/0011280 A1    Jan. 20, 2011

Related U.S. Application Data

(60) Provisional application No. 61/270,490, filed on Jul. 9, 2009.

(51) Int. Cl.
*A23B 4/02*    (2006.01)

(52) U.S. Cl.
USPC .............. 99/494; 99/537; 99/538; 99/547; 99/553; 99/554; 99/555; 99/556; 99/562; 99/565; 99/566; 99/567; 99/568; 30/113.1; 30/113.2; 30/113.3

(58) Field of Classification Search
USPC .......... 99/494, 537–538, 547, 553–556, 562, 99/565–568; 30/113.1–113.3
See application file for complete search history.

(56) References Cited

U.S. PATENT DOCUMENTS

| | | | | |
|---|---|---|---|---|
| 921,980 A | * | 5/1909 | Hackman et al. | 99/494 |
| 1,056,965 A | * | 3/1913 | Baltzley | 99/555 |
| 1,155,139 A | * | 9/1915 | Felker | 99/493 |
| 1,316,315 A | * | 9/1919 | Mars | 30/120.1 |
| 1,353,328 A | * | 9/1920 | Dunkley | 30/113.1 |
| 1,370,097 A | * | 3/1921 | Dunkley | 30/113.1 |
| 1,370,098 A | * | 3/1921 | Dunkley | 30/113.1 |
| 1,370,099 A | * | 3/1921 | Dunkley | 30/113.1 |
| 1,374,289 A | * | 4/1921 | Dunkley | 30/113.1 |
| 1,448,652 A | * | 3/1923 | Anderson et al. | 30/113.1 |
| 1,917,137 A | * | 7/1933 | Marchio | 99/450.7 |
| 1,971,222 A | * | 8/1934 | Hunter | 30/315 |
| 1,984,361 A | * | 12/1934 | Davison et al. | 99/553 |
| 2,055,394 A | * | 9/1936 | Thomas | 209/283 |
| 2,118,976 A | * | 5/1938 | Larkin | 30/113.3 |
| 2,463,854 A | * | 3/1949 | Cowan | 99/559 |
| 3,161,154 A | * | 12/1964 | Schott | 99/450.8 |
| 3,241,477 A | * | 3/1966 | Jenner | 99/345 |
| 3,483,810 A | * | 12/1969 | Peters et al. | 99/532 |
| 3,754,469 A | * | 8/1973 | Gasior | 99/532 |
| 4,064,879 A | * | 12/1977 | Leibinsohn | 604/121 |
| 4,211,160 A | * | 7/1980 | Bieser | 99/494 |
| 4,258,067 A | * | 3/1981 | Stoll et al. | 426/281 |
| 4,344,359 A | * | 8/1982 | Frechou et al. | 99/580 |
| 4,703,688 A | * | 11/1987 | Ochs | 99/450.8 |
| 5,226,897 A | * | 7/1993 | Nevens et al. | 604/218 |
| 5,699,725 A | * | 12/1997 | Poltielov | 99/494 |
| 5,794,344 A | * | 8/1998 | Poulos et al. | 30/113.1 |
| 5,900,265 A | * | 5/1999 | Rutherford | 426/281 |

(Continued)

*Primary Examiner* — Henry Yuen
*Assistant Examiner* — Brett Spurlock
(74) *Attorney, Agent, or Firm* — John R. Benefiel

(57) ABSTRACT

A stuffing hand tool for inserting food material into pitted or cored produce items such as olives, figs, strawberries, cherries, which includes a body easily gripped with one hand by a user allowing a tube projecting from one end to be pressed into a mass of food material creating a plug of food material retained in the tube which is stuffed into an item when a plunger is advanced by depressing a pusher cylinder extended out from the opposite end of the body.

5 Claims, 3 Drawing Sheets

(56) References Cited

U.S. PATENT DOCUMENTS

| | | | |
|---|---|---|---|
| 6,117,467 A * | 9/2000 | Huling | 426/281 |
| 6,148,719 A * | 11/2000 | Poltielov | 99/544 |
| RE37,321 E * | 8/2001 | Poltielov | 99/494 |
| 6,457,400 B1 * | 10/2002 | Hutzler | 99/345 |
| 6,578,470 B2 * | 6/2003 | Backus et al. | 99/345 |
| 6,840,161 B2 * | 1/2005 | Backus et al. | 99/345 |
| 6,860,197 B2 * | 3/2005 | Gable | 99/538 |
| 2001/0039885 A1 * | 11/2001 | Haig | 99/494 |
| 2002/0195003 A1 * | 12/2002 | Backus et al. | 99/532 |
| 2003/0126997 A1 * | 7/2003 | Backus et al. | 99/494 |
| 2003/0136274 A1 * | 7/2003 | Caskey | 99/494 |
| 2004/0149146 A1 * | 8/2004 | Jenkins et al. | 99/494 |
| 2004/0194644 A1 * | 10/2004 | Backus et al. | 99/532 |
| 2005/0066824 A1 * | 3/2005 | Brown et al. | 99/547 |
| 2006/0162580 A1 * | 7/2006 | Lowry et al. | 99/537 |
| 2008/0314261 A1 * | 12/2008 | Hensel | 99/511 |
| 2009/0068327 A1 * | 3/2009 | Iglesias | 426/281 |
| 2009/0211461 A1 * | 8/2009 | Berger | 99/538 |

\* cited by examiner

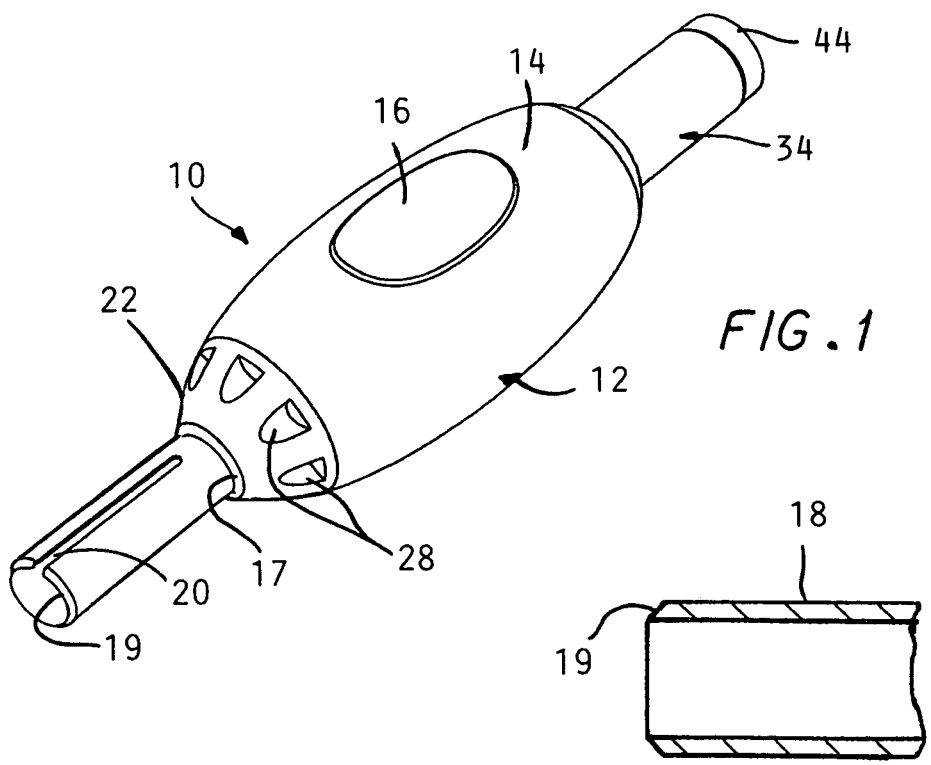
FIG. 1
FIG. 1A
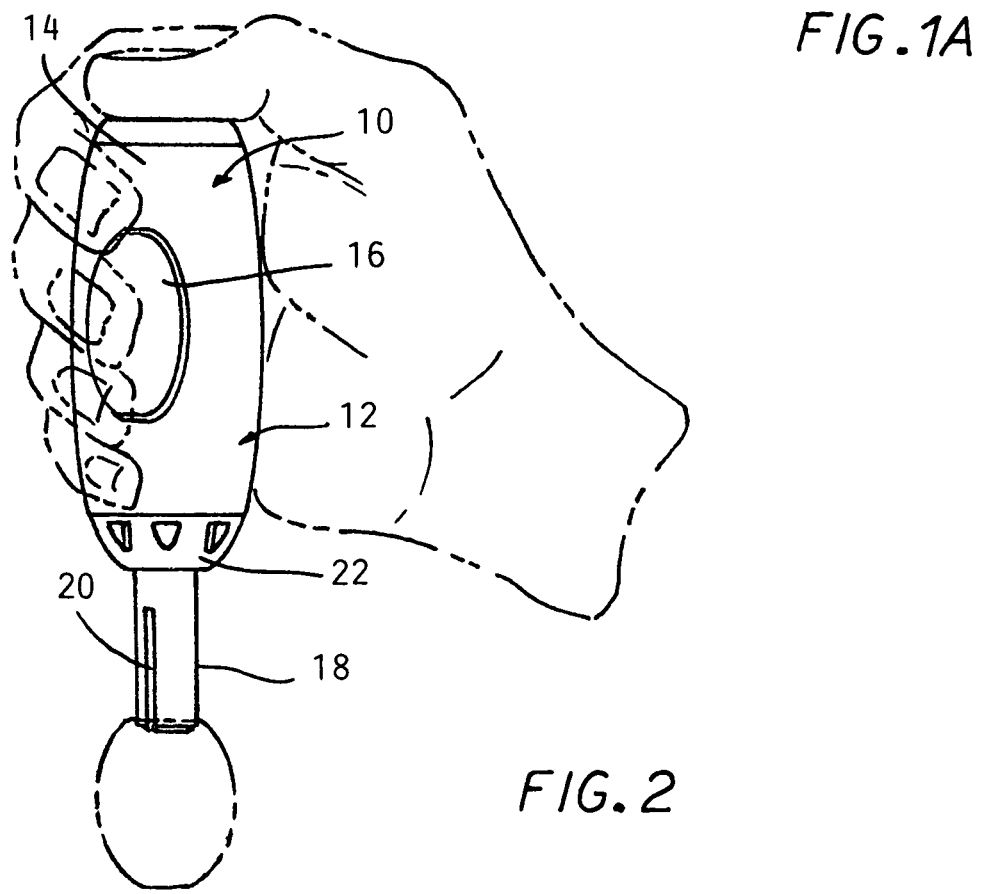
FIG. 2

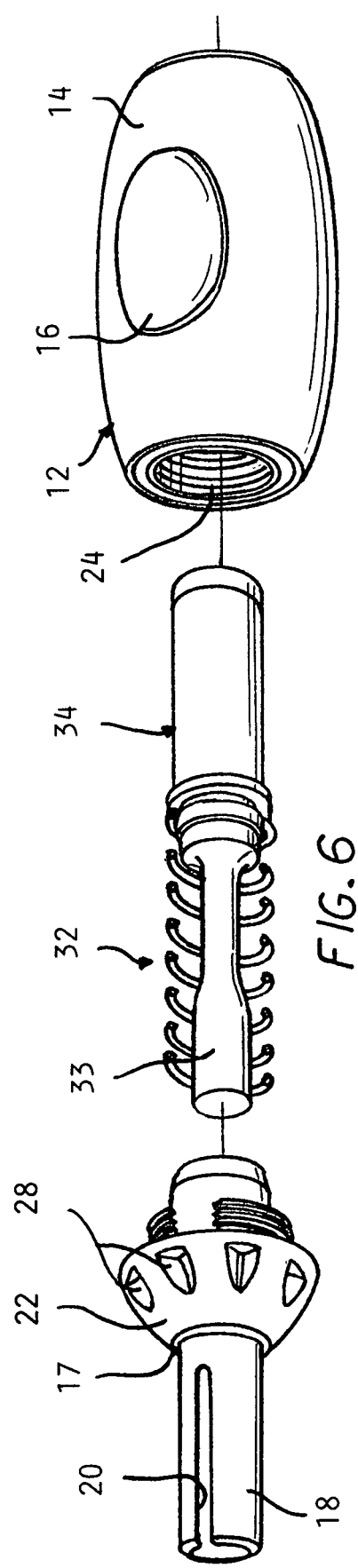
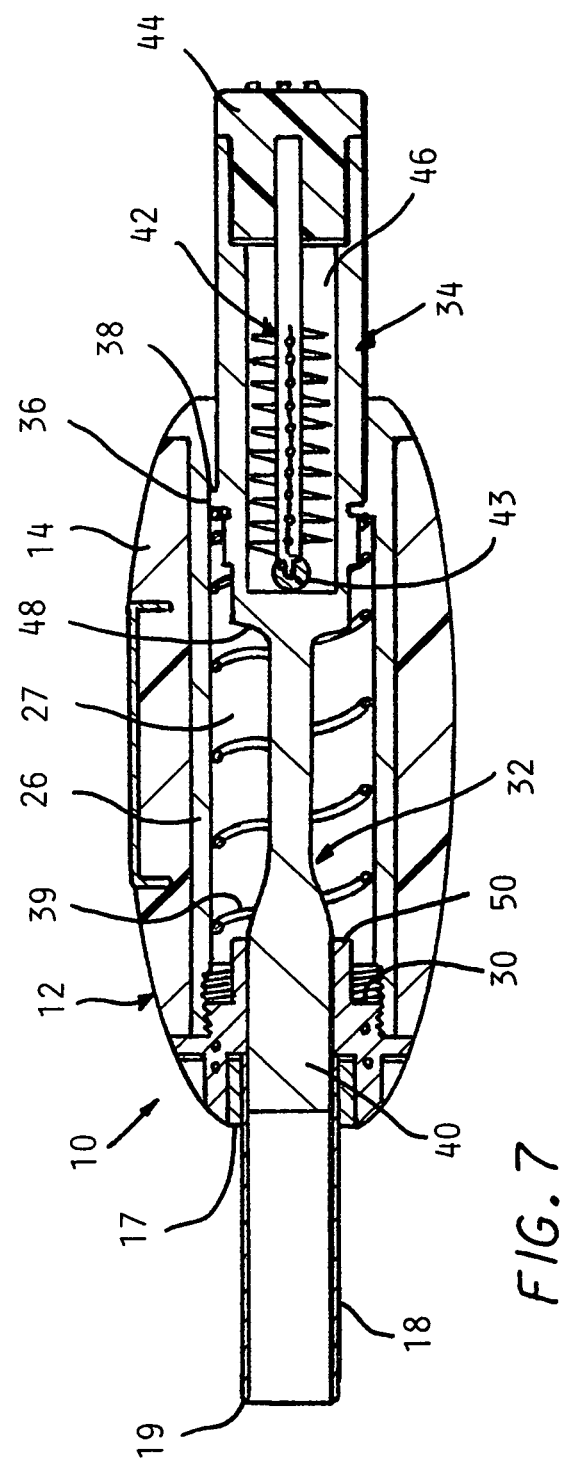
FIG. 6
FIG. 7

HAND TOOL FOR STUFFING PITTED OR CORED PRODUCE

CROSS REFERENCE TO RELATED APPLICATIONS

This application claims the benefit of U.S. provisional application No. 61/270,490 filed on Jul. 9, 2009, and is incorporated by reference herein.

BACKGROUND OF THE INVENTION

This invention concerns a hand tool for stuffing pitted or cored produce such as olives, figs, cherries and strawberries.

Stuffed pitted olives are used in various mixed drinks and in also hors d'oeuvres and often are sold stuffed with pimento or other food material. Such stuffing is carried out on a commercial scale with machines that also pit the olives, such as described in U.S. Pat. No. 4,847,101.

It would be desirable to enable consumers to conveniently stuff pitted olives with food material of their own choosing such as jalapenos, garlic, various cheese, chipotle, etc., to provide a variety of tastes for use in cocktails, appetizers, etc.

It also would be desirable to be able to conveniently stuff other pitted or cored produce such as figs, cherries, strawberries, etc. with such stuffings as mascarpone cheese, chocolate, goat cheese, etc.

It is the object of the present invention to provide a hand tool for conveniently stuffing such produce items as pitted olives, figs or cherries or cored items such as strawberries with a selected food material.

SUMMARY OF THE INVENTION

The above object and other objects which will become apparent upon a reading of the following specification and claims are achieved by a stuffing tool having an elongated body able to be gripped in one hand of a user.

A hollow tube projects from one end of the body, preferably made of stainless steel.

A spring loaded plunger is mountable in a lengthwise cavity formed in the body with a pusher cylinder fixed at one end to a plunger member projecting out from the other end of the body. The plunger member is slidable in the tube with the spring urging the plunger member to a retracted position with only its tip received in the fixed end of the tube.

While gripping the body in one hand, the tube may be loaded with a plug of food material stuffing as by stabbing or pressing the tube into a mass of the stuffing material, such as a bar of cheese, etc. The tube is slotted on one side so that the size of the plug of stuffing contained in the tube is visible to the user.

The tube is then placed in an opening in the olive or other produce item to be stuffed and the plunger pusher cylinder depressed with the thumb to advance the plunger member through the tube and thereby forcing the plug of stuffing into an interior cavity of the item to be stuffed.

The stuffing tool is easily disassembled for cleaning by unthreading an end piece from one end of the body to which the tube is affixed, and allowing the plunger assembly to be pulled out from the same end of the body cavity in which it is normally housed.

The push sleeve cylinder is hollow and may store a cleaning brush for cleaning of the stuffing tool tube.

DESCRIPTION OF THE DRAWING FIGURES

FIG. 1 is a pictorial view of stuffing tool according to the invention.

FIG. 1A is an enlarged fragmentary tip portion of a forming tube showing the sharpened outer end.

FIG. 2 is a side view of the stuffing tool shown in FIG. 1.

FIG. 6 is an exploded pictorial view of the components of the stuffing tool shown in FIGS. 1-5.

FIG. 7 is a lengthwise sectional view of the stuffing tool shown in FIGS. 1-5.

DETAILED DESCRIPTION

Figure 3:
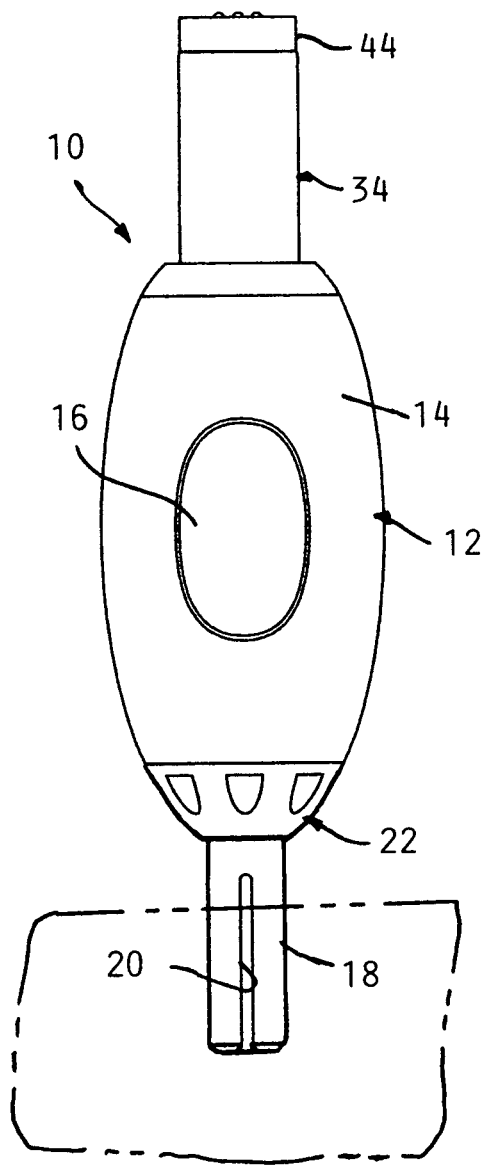
FIG. 3 is a top view of the stuffing tool shown in FIGS. 1 and 2.
Figure 4:
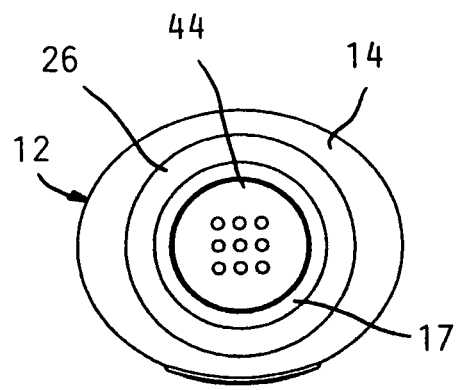
FIG. 4 is a right side end view of the stuffing tool shown in FIGS. 1-3.
Figure 5:
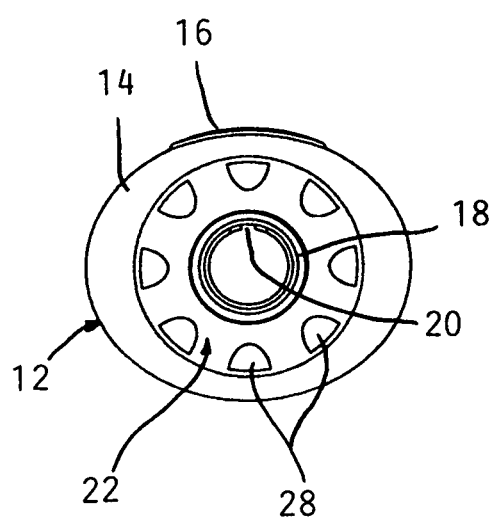
FIG. 5 is a left side end view of the stuffing tool shown in FIGS. 1-4.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

FIGS. 1-5 are exterior views of a stuffing hand tool 10, which includes a body 12 which has flattened ovate shape wider on one side (FIG. 3) than the other (FIG. 2) to be easily gripped in one hand. A soft elastomeric material such as SANTOPRENE™ is molded to the outside of the body 12, forming a grip 14.

A metallic decorative medallion 16 may be embedded in the grip 14.

A plug forming straight sided tube 18 projects axially from one end of the body 12, to which it is fixed with an open opposite end, the tube 18 formed with a slot 20 extending for most of the length of the tube 18.

The tube 18 is fixed in a threaded end piece 22 received in a threaded bore 24 in a metal sleeve 26 forming the structural core of the body 12. The tube 18 may be mounted to the sleeve 26 by a tube holder ring 17 (FIG. 7) which itself is inserted and fixed in a bore 30 in the end piece 22 and the tube 18 received and fixed therein as by a press fitting.

As seen in FIG. 1A, the tube 18 has a sharpened open end 19 to facilitate penetration into stuffing food material (FIG. 3). The tube 18 is preferably formed of a suitable grade of stainless steel able to hold the edge 19 when sharpened.

A series of recesses 28 are formed around the perimeter of the end piece 22 to facilitate gripping engagement to unthread the end piece 22 for disassembly of the tool 10 for cleaning.

The end piece 22 has a threaded portion 23 received into the threaded bore 24 of the sleeve 26.

A plunger assembly 32 is received within a through cavity 27 of the sleeve 26 with a push cylinder 34 normally projecting out the opposite end of the body 12 from the tube 18. A shoulder 36 thereon engages a stop 38 formed on the sleeve 26 when a plunger member 40 is fully retracted to the right in FIG. 7 under the urging of a return spring 39 received over the plunger member 40 and engaging one side of the shoulder 36. The plunger member 40 has only its tip 33 received in the tube 18 when fully retracted.

The push cylinder 34 is hollow and contains a small cleaning brush 42 which can be accessed by removal of an end cap 44 closing off the cavity 46 holding the brush 42.

The plunger member 40 is slidably received in one end of the tube 18 and can be completely advanced through the tube 18 by depressing the push cylinder 34 able to be done with the thumb of a user while gripping the grip 14 of the body 12 with the fingers encircling the grip and body (FIG. 2) to eject a plug of stuffing held in the tube 18.

A limit stop 48 on the plunger member 40 engages a boss end 50 of the end piece 22 when push cylinder 34 is fully depressed.

In use, as seen in FIG. 3, the tip 19 of the tube 18 is first pressed into a mass of food material, forming a plug of material retained within the tube 18. The slot 20 allows the user to observe the size of the plug retained in the tube 18. The tube tip 19 is then placed in the opening of the pitted olive or other item to be stuffed (FIG. 2) and the push cylinder 34 depressed to advance the plunger member 40 completely through the tube 18 expelling the plug from the tube 18 into the cavity of the olive or other item.

Accordingly, various pitted or cored produce such as olives, cherries, etc. may be conveniently stuffed by the user with any desired food material by manual operation of the easy to use tool of the invention.

The invention claimed is:

1. A hand tool for stuffing food material through an opening into a hollow in a product item, comprising:
    an elongated body having an outer grip thereon configured to be grasped by the fingers of one hand of a user, said body having a through cavity formed therein;
    a straight sided tube fixed at one end to one end of said body and projecting away from one end of said body and defining a through opening communicating with said body cavity, and straight sided tube having an open free end opposite said one end able to be pushed into a mass of food material to form a plug thereof retained in said tube;
    said tube attached at one end to an end piece having a threaded portion advanced into a threaded bore at said one end of said body to enable removal of said tube and said plunger assembly from said body for cleaning thereof by unthreading said end piece from said threaded bore;
    a series of recesses formed around the perimeter of the end piece to facilitate gripping engagement to unthread the end piece for disassembly of the tool for cleaning;
    a plunger assembly disposed in said body cavity including a plunger member having on end received in said tube one end, a spring included in said plunger assembly urging said plunger member to move back to a fully retracted position in said tube, with only a tip portion of said plunger received in said one end of said tube, said plunger member movable into said tube so as to be advanced completely through said tube;
    said plunger assembly further including a push cylinder attached at one end to said plunger member and having an opposite end extending out through an opposite end of said body cavity to an extent allowing said plunger member to be advanced completely through said tube by fully advancing said plunger member from said retracted position, said push cylinder able to be pushed into said body cavity by engagement of a user's thumb on one hand while at the same gripping said outer grip with the fingers of the one hand whereby a plug of food material can be inserted into said tube from a solid mass by a user gripping said outer grip with the fingers of one hand and stabbing said open end of said tube into said solid mass and then pulling the same out, and said plug of food material in said tube forced out and stuffed into a cavity of a produce item by pushing down on said push cylinder with the user's thumb while gripping said outer grip with the fingers of the one hand.

2. The hand tool according to claim 1 wherein said tube free end is sharpened to facilitate stabbing penetration into food material and to load a plug therein.

3. The stuffing tool according to claim 1 wherein said tube is slotted to enable viewing the size of a plug retained therein.

4. The stuffing tool according to claim 1 wherein said pusher cylinder is hollow and contains a brush for cleaning said tube.

5. The stuffing tool according to claim 1 wherein said body is enclosed with an elastomeric covering on said body comprising said outer grip.

\* \* \* \* \*